United States Patent [19]

Kawakami

[11] 3,954,368

[45] May 4, 1976

[54] APPARATUS FOR CONTINUOUSLY FABRICATING CUSHIONING LAMINATED SHEETS

[76] Inventor: Satoshi Kawakami, 57-1254, Aza Horagai, Narumi-cho, Midori, Nagoya, Aichi, Japan

[22] Filed: Feb. 6, 1974

[21] Appl. No.: 440,055

[30] Foreign Application Priority Data

Feb. 7, 1973   Japan................................ 48-15400

[52] U.S. Cl............................. 425/326 R; 425/362; 425/363; 425/384; 425/388; 156/285
[51] Int. Cl.².............................................. B29D 7/10
[58] Field of Search .......... 425/325, 326, 327, 335, 425/336, 337, DIG. 235, 388, 403, 404, 224, 362, 237, 328, 385; 164/277; 156/244, 285, 500; 264/90, 92, 101, 102

[56] References Cited
UNITED STATES PATENTS

| | | | |
|---|---|---|---|
| 3,142,599 | 7/1964 | Chavannes...................... | 156/285 X |
| 3,165,432 | 1/1965 | Plaskett .......................... | 156/285 X |
| 3,421,964 | 1/1969 | Arbit............................... | 425/325 X |
| 3,709,647 | 1/1973 | Barnhart......................... | 425/224 |
| 3,756,884 | 9/1973 | Hagino........................... | 156/285 X |
| 3,837,973 | 9/1974 | Asakura et al.................. | 156/285 X |

FOREIGN PATENTS OR APPLICATIONS

4,514,198   5/1970   Japan............................. 425/326 R

*Primary Examiner*—R. Spencer Annear
*Assistant Examiner*—Mark Rosenbaum
*Attorney, Agent, or Firm*—Fred Philpitt

[57] ABSTRACT

Apparatus for fabricating a cellular laminated material from two plastic sheets includes a molding rotatable cylinder in contact with a pressure rotatable cylinder. Cooling water injection and air removal are accomplished within the interior of the molding cylinder. The contact portion of the two cylinders receives one of the plastic sheets. The other plastic sheet is cooled, heated and stretched prior to its being fed for embossing and laminating with the other plastic sheet on the molding cylinder. One embodiment has ends on the molding cylinder to provide an air-tight enclosure and the other embodiment is open at the ends thereof.

7 Claims, 6 Drawing Figures

Fig. 5
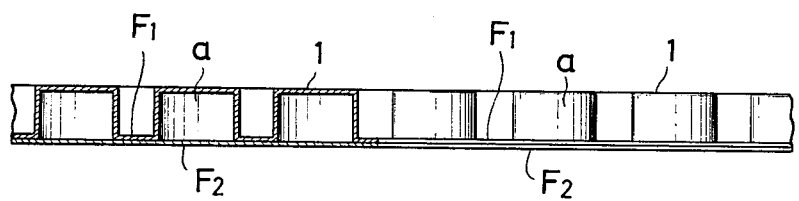
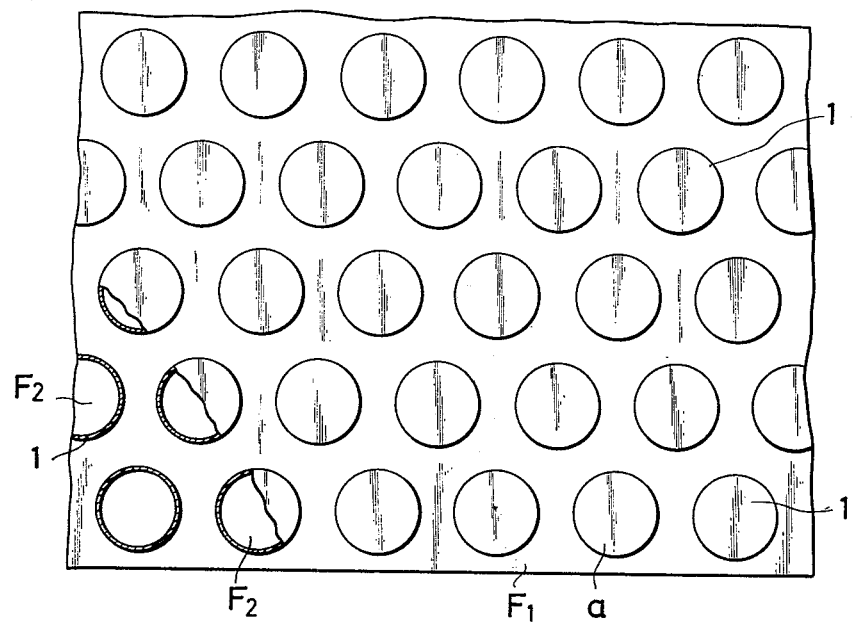
Fig. 6

APPARATUS FOR CONTINUOUSLY FABRICATING CUSHIONING LAMINATED SHEETS

SUMMARY OF THE INVENTION

The present invention relates to an apparatus for continuously fabricating cushioning laminated sheets that incorporate a plurality of air-entrapping independent cells out of thermoplastic synthetic resin films by laminating and welding processes.

Thus, the products to be fabricated by an apparatus according to the present invention are cushioning laminated sheets that are formed by vacuum molding a plurality of independent concave cells of any desired planar shape in a first thermoplastic synthetic resin film (hereinafter called plastic film) while this film is maintained in a heat-softened condition, and laminating and welding a second plastic sheet that is maintained in a heat-softened but flat condition, onto the first plastic sheet in such a way that said independent concave cells entrap air to form the independent air cells.

Up to the present, there have been proposed various apparatuses for continuously fabricating cushioning laminated sheets having the above-described structure, a typical one of which being an apparatus disclosed in the U.S. Pat. No. 3,208,898 (apparatus for embossing and laminating materials). However, the molding roller which plays the most important role in the above-quoted apparatus has disadvantages such as its vacuum system being connected to an externally provided vacuum source includes both a portion stationary relative to the roller surface and a portion that revolves relative to the roller surface, and it has built-in within it a cooling mechanism that is connected to a cooling water circulating source, and further because there must be provided means of preventing the vacuum system air and the cooling system water from leaking, the whole construction becomes so complicated that it is prone to erratic operations and troubles and that the cost of the molding roller becomes inevitably high. Furthermore, since the cooling efficiency of this cooling system on the molding roller is low, not only various problems arise in the plastic film embossing process, but also a limit is imposed on further increase of embossing speed, and hence of producing efficiency. There is also known a method wherein the molding roller is directly cooled externally with cooling water. In this method, while cooling efficiency is improved, a considerable disadvantage is introduced in respect of the products. That is to say, because the suction holes provided to evacuate air in the independent mold cavities arranged on the surface of the molding roller must be made so small in order to secure the required embossing form accuracy, that during an embossing process, excess cooling water is left as water film inside the independent mold cavities and the suction holes, and therefore, when a plastic film in a hot and softened condition comes into contact with the peripheral surface of the molding roller, this water instantly evaporates and absorbs much heat from limited areas to spoil accurate embossing and to give rise to many defective products.

In contrast, an apparatus according to the present invention is of such a construction that it completely eliminates those above disadvantages of the conventional devices. Two embodiments of the apparatuses according to the present invention are disclosed herein. A thermoplastic resin is provided from two T-dies which continuously extrude plastic films and these T-dies are arranged in such a way that said extruded plastic films are discharged from the respective dies downwardly in a parallel face to face relationship. Underneath the first T-die there are provided approximately on the same horizontal plane a cooling roller and a heating roller. Underneath the heating roller there is provided a stretching roller disposed horizontally along its longitudinal axis so that a stretching span is made as small as possible. In proximity to the lower periphery of the stretching roller there is a horizontally disposed molding cylinder, and in pressure engagement with said molding cylinder, there is a horizontally mounted pressure roller, said cylinder and said pressure roller being disposed in such a manner that they make contact with each other at a prerequired distance from the position directly below the stretching roller, and also at a position substantially on the vertical downward extension of said second T-die. On the opposite side of the molding cylinder from the pressure roller, there is a take-up roller horizontally mounted in contact with said molding cylinder. Outwardly of, and on the side opposite from the molding cylinder and associated with the take-up roller, there is a horizontally mounted guide-delivery roller. With the rotation speed of the molding cylinder taken as a reference standard, the stretching roller and the take-up roller are driven at such speeds as to give substantially the same peripheral speeds to them as that of the molding cylinder. The heating roller is driven at such a speed that its peripheral speed is slower than that of the stretching roller by a predetermined ratio, and the cooling roller is driven at a peripheral speed that is substantially equal to that of the heating roller. The pressure roller is an idler roller which is in elastic contact with the molding cylinder and driven by it. The guide-delivery roller is either driven at a suitable peripheral speed or allowed to run freely driven by the travelling product. In the illustrated arrangement, the cooling roller, pressure roller and take-up roller have respective built-in cooling systems which force-cool the respective rollers at all times by circulating cooling medium. Their high cooling efficiency is attained by a simple construction wherein the roller proper of each of the cooling roller, pressure roller and take-up roller is formed with an inner hollow space. Thus, the rotary shaft for supporting the respective roller proper at its centerline is formed to incorporate an inner jacket portion and an outer jacket portion. Cooling water is circulated by a cooling water force-circulating device (not shown) which is sent into said inner hollow space of said roller proper through said inner jacket tube, and then sent out through said outer jacket tube, to circulate constantly in said hollow space and to cool said roller proper. The heating roller and the stretching roller each have a built-in heating system for heating the respective rollers. This heating system may be any of the conventional designs such as a high-pressure steam circulation system, a high-temperature oil circulation system, and an electric heating system, but an electric heating system incorporating an electric heater tube in the roller is most desirable, in view of the ease of heating temperature adjustment.

BRIEF DESCRIPTION OF THE DRAWINGS

FIG. 5 is a side view of a cushioning laminated sheet fabricated by the use of apparatuses according to the present invention showing half portion in section; and FIG. 6 is a plan view of the same laminated sheet partly shown in section.

DETAILED DESCRIPTION OF THE TWO EMBODIMENTS

Figure 1:
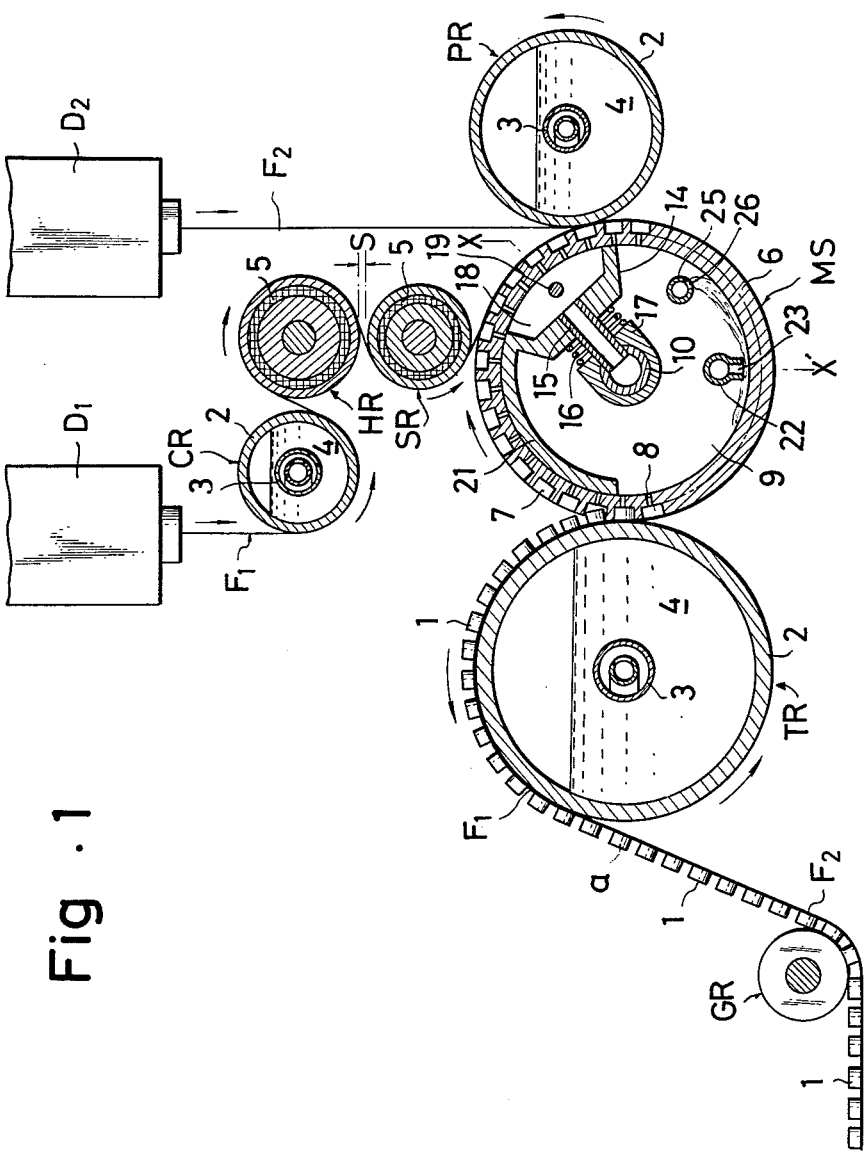
FIG. 1 is a schematic side elevation of one form of apparatus in accordance with the present invention shown in section.
Figure 2:
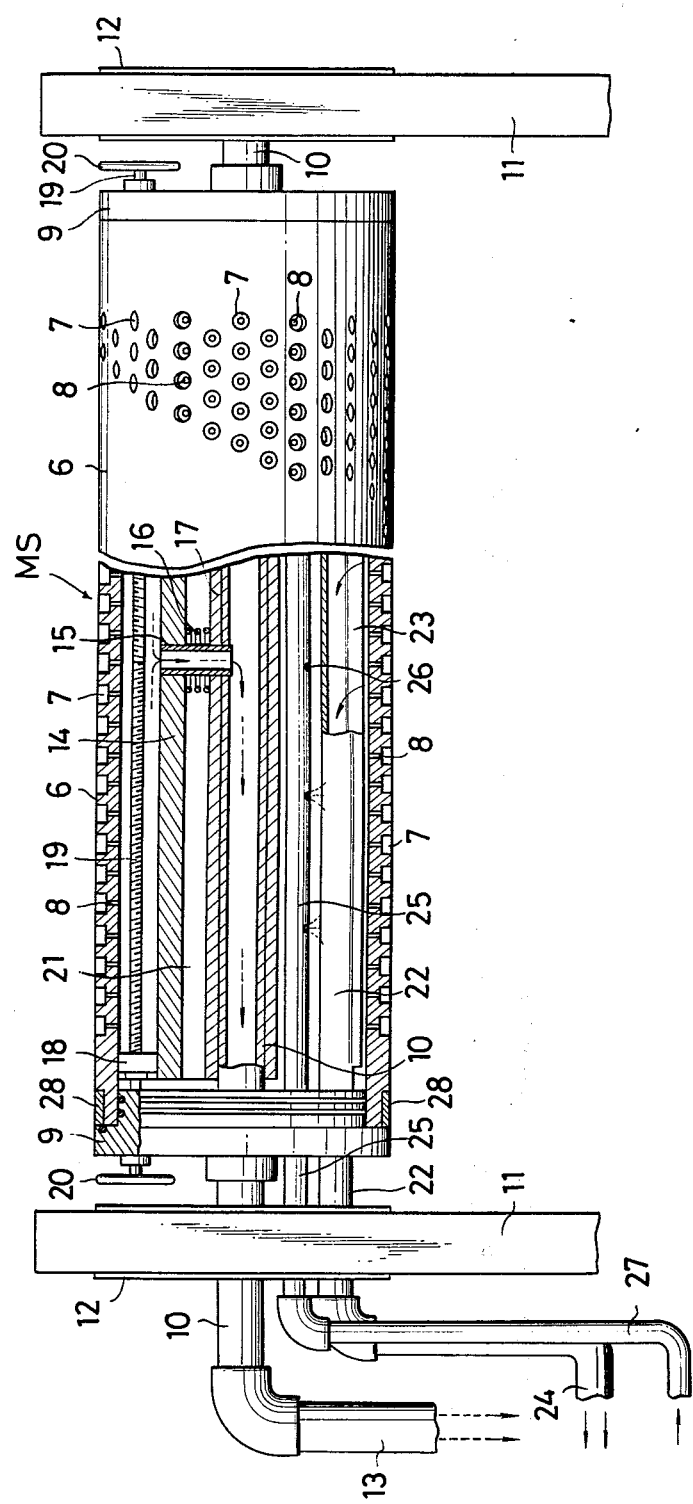
FIG. 2 is a longitudinal side view of the molding cylinder used in the apparatus shown in FIG. 1 shown partly in section.
Figure 3:
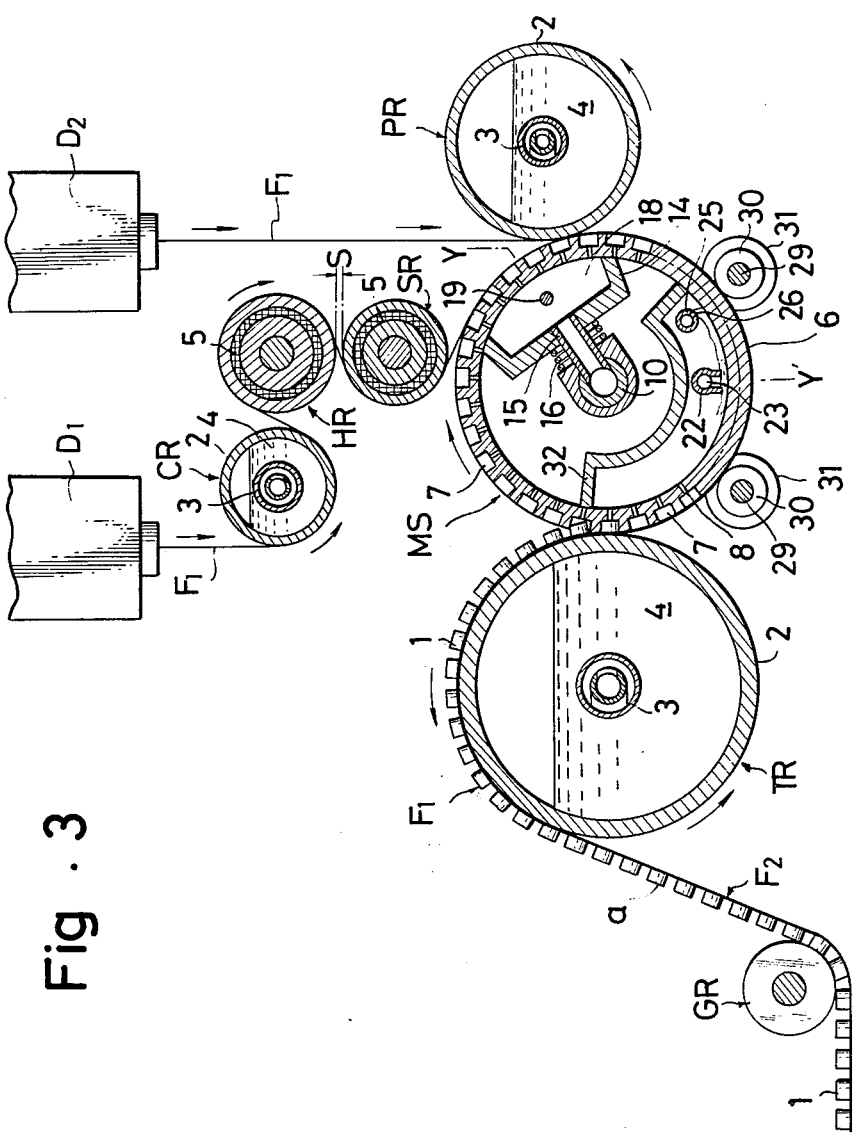
FIG. 3 is a schematic longitudinal side elevation of another form of apparatus in accordance with the present invention shown in section.
Figure 4:
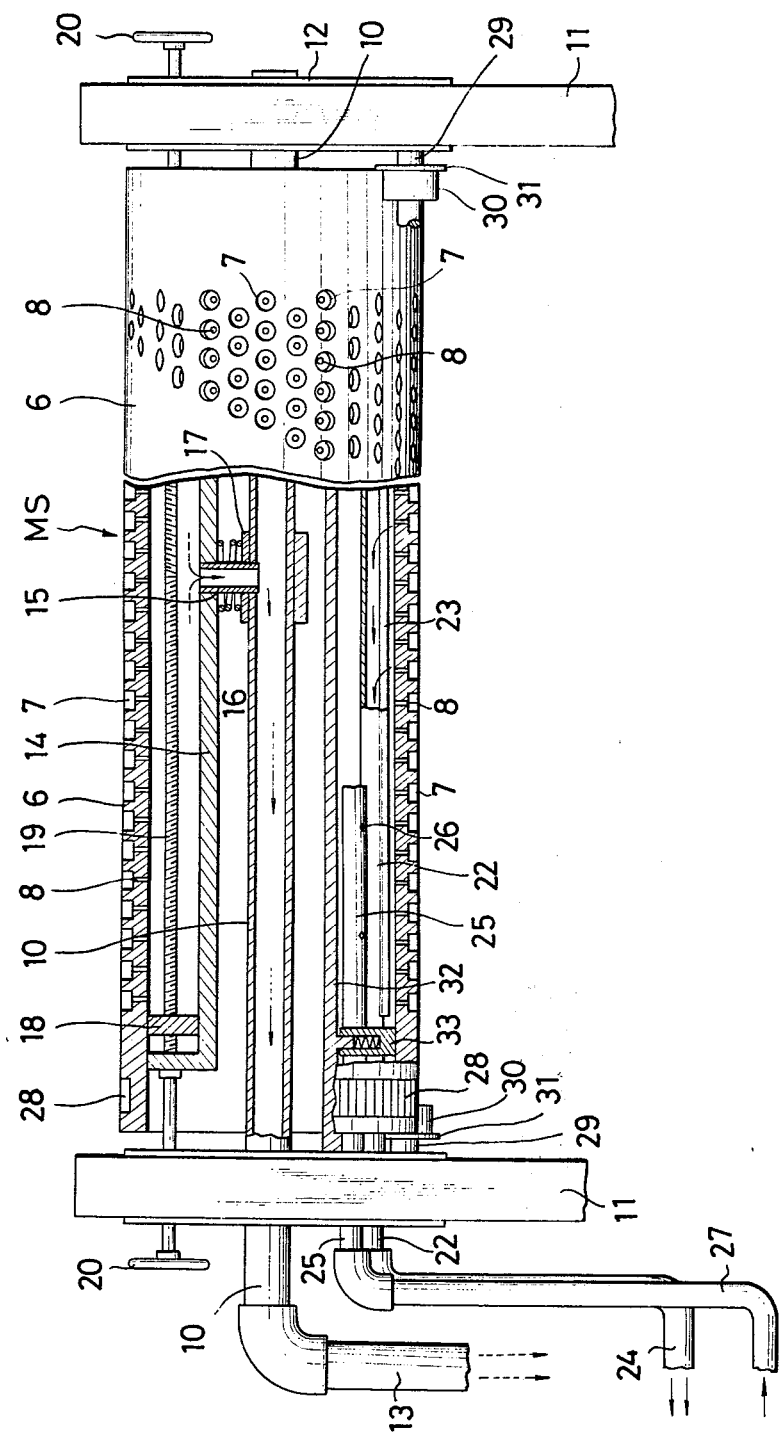
FIG. 4 is a longitudinal side view of the molding cylinder used in the apparatus shown in FIG. 3 shown partly in section.

Now, a molding cylinder MS, which is the most important element in apparatuses according to the present invention, may be of either of the following two types:

One type is of a construction shown in FIGS. 1 and 2, and the other is of a construction shown in FIGS. 3 and 4. Although both of them can accomplish the object of the present invention effectively, for the purpose of providing an easy and ready explanation, the construction and the method of molding based on the present invention will be described in detail below making reference to FIGS. 1 and 2. On the peripheral surface of a cylinder body 6, which is an essential constituent of the molding cylinder MS, there are formed a plurality of mold cavities 7 having desired planar forms, and at the bottom center of each of said mold cavities 7, there is a suction orifice 8 of small diameter so drilled that the mold cavity is connected with the internal hollow space of the cylinder body 6. To each end of the cylinder body 6 is secured a stationary flange 9 in such a manner that the internal hollow space is sealed with it but the cylinder body is rotatable, and a hollow shaft 10 extending through the flanges 9 is secured thereto, both projecting ends of the shaft 10 being rotatably and adjustably journaled in bearings 12 of machine frame members 11 which are disposed each outside of each said flange, with the result that the cylinder body 6 is horizontally mounted with a freedom of revolution. To one projecting end of said hollow shaft 10 is connected a piping 13 leading to a vacuum pump (not shown), while the other end of the hollow shaft 10 is closed against external communication. Located inside the cylinder body 6 parallel with the hollow shaft 10 is a trough-shaped suction case 14, the opening of which is so dimensioned as to approximately correspond to the part of the peripheral surface area of the molding cylinder that is defined between a stretching roller SR and a pressure roller PR, and there is also an air suction pipe 15 projecting from the hollow shaft 10 at a suitable position along its length, with its end slidably penetrating through the bottom wall of the suction case 14 so as to provide a communication between the space inside the suction case and the vacuum pipe. Disposed around said air suction pipe 15 is a compression coil spring 16 compressed between the bottom wall of the suction case 14 and a seat 17 provided on the hollow shaft 10, for the purpose of bringing the opening edge of the suction case 14 into an airtight contact with the internal cylindrical surface of the cylinder body 6. Inside the suction case 14 at both ends, there are adjustable members 18 disposed in an air-tight sliding contact with the internal cylindrical surface of the cylinder body 6, said adjustable members 18 being threaded onto a threaded rod 19 which is horizontally mounted within said suction case 14 and which is provided with a thread of one direction on one half and a thread of the opposite direction on the other half. Both ends of said threaded rod 19 are supported by the stationary flanges 9 in such a manner that it is prevented from moving axially but is permitted to turn freely around its axis, and the ends of said threaded rod 19 are further extended beyond the stationary flanges 9 to receive handwheels 20 at the ends. Disposed in close contact with the internal cylindrical surface of the cylinder body 6 and attached to the suction case 14 is a shield plate 21 which approximately covers the zone of said internal cylindrical surface lying between a take-up roller TR and a stretching roller SR. Within the cylinder body 6 near the bottom, there is a water suction pipe 22 horizontally installed directly underneath the hollow shaft 10, that is provided with a water suction trough opening 23 formed at the bottom portion thereof, with an internal communication therewith, said suction trough opening being projecting into a region in close proximity of the internal surface of the cylinder body 6. Both ends of this water suction pipe 22 are fixedly inserted into the stationary flanges 9, but one end of this water suction pipe 22 extends through the stationary flange 9 and the bearing portion of the machine frame 11, and a drain pipe 24 leading to a suction pump means (not shown) is connected to this extending end of the water suction pipe 22, while the other end of this water suction pipe 22 is closed. Upwardly of the water suction pipe 22 within the cylinder body 6 near the contact region between the cylinder 6 and the pressure roller PR, there is horizontally installed a water injection pipe 25 having water injection orifices directed towards the internal surface of the cylinder body 6, distributed throughout its length. The water injection pipe 25 is secured to the stationary flanges 9, at its both ends, and its one end extends through the bearing portion 12 of the machine frame 11. To this end, a water supply piping 27 leading to a water supply pump (not shown) is connected, and the other end is closed. In operation, a gear ring secured around the cylinder body 6 at one end thereof is so driven that its peripheral surface is moved in the direction from the stretching roller SR to the pressure roller PR at a constant speed. The internal space of the suction case 14 is force-evacuated by a vacuum means through an air suction pipe 15, hollow shaft 10 and vacuum pipe 13 to a vacuum of approx. 100 to 250 mm Hg, whereby vacuum is applied to the mold cavities 7 within the area covered by the opening of the suction case 14 through the respective suction orifices 8. Meanwhile, the internal hollow space of the cylinder body 6 is continously supplied with an adequate amount of water through the water supply pipe 27, water injection pipe 25 and water injection orifices 26. The cooling water injected into the internal hollow space of the cylinder body 6 is continuously withdrawn under the suction applied by the water suction pump to the water suction trough opening 23 through the water suction pipe 22 and water drain pipe 24, whereby the suction force for water discharge is utilized to maintain the internal space of the cylinder body 6 at a reduced pressure of approx. 10 to 50 mm Hg. It can be understood that not only can the injection of cooling water into the internal space of the cylinder body 6 and the withdrawal of this cooling water from said space be accomplished with respective separate water supply pump means and water suction pump means, but also by forming a cooling water injection and discharging circuit with the use of a cooling water circulating pump, a saving on water consumption may be realized. Now, plastic films F1 and F2 are continuously extruded out of said two T-dies, D1 and D2, and the first plastic film F1 passes around the lower periphery of a cooling roller CR, then, around the upper periphery of a heating roller HR, thence, around the stretching roller SR and then, onto the peripheral surface of the molding cylinder MS, while the second plastic film F2 is directly led to the portion of engagement between the molding cylinder MS and the pressure roller PR.

In this arrangement, the plastic film F1, continuously extruded in a heat-softened condition out of the first T-dies, D1 is cooled as it passes around the cooling roller CR and is reheated by the subsequent heating roller HR before proceeding over to the stretching roller SR. As the peripheral speed of the heating roller HR is lower than that of the stretching roller SR, more specifically, as the peripheral speed of the stretching roller SR is higher than that of the heating roller HR by a predetermined ratio, the film is stretched as it passes from the heating roller HR to the stretching roller SR. However, because the stretching span S between the heating roller HR and the stretching roller SR is made as small as practicable, the plastic film F1 is immediately wound around the stretching roller SR without being overly shrinking in the lateral direction despite its forced stretch in the feed direction, with the result that the plastic film F1 is simultaneously stretched in the feed direction as well as in the lateral direction. In this way, the plastic film F1 is biaxially stretched, and, as is known among those specialized in the art, its strength is increased due to a molecular orientation effect, before being fed onto the peripheral surface of the molding cylinder MS.

The reason for once cooling the plastic film F1 that is extruded out of the first T-die D1 in a heat-softened condition with the cooling roller CR before reheating it with the heating roller, in the process between the cooling roller CR and the molding cylinder MS, in preparation to the stretching operation, is to adjust the temperature of the plastic film F1 at the stretching span S between the heating roller HR and the stretching roller SR to an optimum stretching temperature determined by the synthetic resin material of the plastic film F1, or more specifically, the so-called second order transition point. Because the plastic film F1 that is cooled by the cooling roller CR to a temperature below the second order transition point is heated by the heating roller HR to its optimum stretching temperature, its temperature is uniform when it is stretched, so that it can attain high strength and uniformity. Experience has shown that the best result was achieved when the peripheral speed of the strectching roller SR was made approx. 200 to 300 percent of that of the heating roller HR, and the stretching span was approx. 2 to 5 mm. It should be understood, however, that the above conditions are mentioned only to give a rough standard, and that appropriate conditions should be selected to suit to the material resin to be used and to other conditions. As is generally well known, a temperature best suited to a high stretching effect lies above, but as near as possible to, the softening point of the plastic, so that the illustrated arrangement is intended to bring the temperature of the plastic film F1 to this temperature at the stretching span S by suitably adjusting the surface temperature of the heating roller HR for heating the plastic film. Thus, the plastic film F1 fed onto the peripheral surface of the molding cylinder MS in a heat-softened condition, so that under the influence of the vacuum inside the mold cavities 7, it is embossed into said mold cavities 7 by atmospheric pressure to form a plurality of independent concave cells 1. Because the embossing process taking place under suction also has a stretching effect, the temperature of the plastic film F1 as it is led around the peripheral surface of the molding cylinder MS is required to be maintained above, but as near as possible to, the softening point, for the same reason as mentioned above. Furthermore, if the temperature of the plastic film is too high, it is over-softened, so that as the film is forced into the mold cavities 7, it is sucked as far into as the suction orifices to produce localized thin parts in the film which is detrimental to its strength. Therefore, the plastic film F1 which comes in contact with the peripheral surface of the molding cylinder MS is appropriately heated to the optimum molding temperature by the stretching roller SR with a view to ensuring a perfect vacuum embossing process as well as a high film strength. Thus, the plastic film F1 in which a plurality of independent cell cavities 1 are vacuum molded while it is put around the surface of the molding cylinder MS, is kept adhering to this surface so that it is carried towards the portion of engagement between the molding cylinder and the pressure roller PS, as the molding cylinder keeps on rotating, and in this engagement portion between the molding cylinder MS and the pressure roller PR, this first plastic film F1 carried by the molding cylinder MS is laminated with the second plastic film F2 that is continuously extruded out of the second T-die D2 located above, in a heat-softened condition. As the second plastic film F2 is laminated over the first plastic film F1, air is entrapped in the independent cell cavities 1 and at the same time, because the two plastic films F1 and F2 are put together in a heat-softened condition, they are fused into a single sheet and the independent cell cavities 1 containing air form independent air cells a. Thereupon, the two plastic films F1 and F2 are cooled by the pressure roller PR so that the shape of the independent air cells a and the fused joints are permanently set, and as the molding cylinder MS keeps on revolving, the laminated plastic films sticking on its periphery surface keeps on moving towards the take-up roller TR. On their way, because the embossed and welded plastic films F1 and F2 are further cooled and solidified by the portion of the molding cylinder MS that is internally cooled by the cooling water being delivered out of the water injection pipe 25, their embossed form is further stabilized. At the take-up roller TR, the embossed plastic film F1 and the welded plastic film F2 are positively peeled off from the peripheral surface of the molding cylinder MS to be carried towards and transferred onto a guide-delivery roller GR as cushioning laminate product for any further operation as the take-up roller revolves. Both the embossed plastic film F1 and the welded plastic film F2 that are taken away from the molding cylinder MS and are cooled by the cooling function of the take-up roller TR while they remain in contact with its periphery surface and are consolidated as cushioning laminate product having the shape as illustrated in FIGS. 5 and 6.

During the embossing operation, as the plastic film F1 at a high temperature is continuously brought into contact with the peripheral surface of the molding cylinder MS, the latter is heated to an increasingly high temperature as the result of temperature build-up. This means that the molding cylinder MS must be cooled by some means. Because the cylinder wall is directly cooled by cooling water delivered out of the water injection pipe 25 into the internal space of the molding cylinder MS, the cooling efficiency is extremely high so that not only the embossing rate can be raised greatly by a greatly increased rotation speed of the molding cylinder MS but also accurate embossing shape and high transparency are secured, and as the result, high-output production of excellent quality laminated sheets is made possible. Furthermore, since the cooling water delivered into the internal space of the molding cylinder MS is withdrawn by the water suction pipe 22 under suction and thereby the pressure in the internal space of the molding sylinder MS is maintained at a reduced level, leakage of the cooling water inside the cylinder through the suction orifices 8 is totally prevented so that any ill effects of leak water on the embossing and welding of the plastic films F1 and F2 are completely avoided. The reason for the provision of a shield plate 21 inside the molding cylinder MS blocking the communicating openings of the suction orifices 8 in the area defined between a line directly opposite to the take-up roller TR and a line directly below the stretching roller SR is to ensure an easy peeling of the embossed and welded plastic films F1 and F2 by insulating these films from the vacuum suction effect of the reduced pressure within the molding cylinder MS as well as to save on the suction capacity of the water suction pump required to attain the degree of vacuum by blocking those suction orifices 8 in the upper region which are not involved in the embossing operation. Furthermore, when the width of the cushioning laminated sheets has to be varied according to the intended application, with this embodiment, this can be accomplished by an adjustment of the effective width of the suction case 14 that is effected through a simultaneous inward or outward displacement of the adjusting members slidably arranged at both ends within the suction case 14, said displacement being accomplished by the rotation of the threaded rod 19 that is driven by either of the two handwheels 20. In this way, the plastic films F1 and F2 extruded out of the respective T-dies D1 and D2 can be embossed and welded over a limited width desired. By displacing the adjusting members 18 at both ends in the internal space of the suction case 14 to adapt to the embossing width in accordance with the required product width, one can not only save on the plastic material but also rationalize the molding operation. In this connection, it is reasonable to provide the water suction pipe 22 and the water injection pipe 25 with respective means for adjusting their suction width and injection width that correspond to the width adjusting mechanism for the suction case 14. As an example of such adjusting means, slidable shielding covers may be mounted over the water suction pipe 22 and the water injection pipe 25 providing a means for adjusting them in phase with the rotation of the threaded rod 19.

Now, another design of the molding cylinder MS which is the most important constituent of an apparatus according to the present invention will be described with reference to FIGS. 3 and 4. The cylinder body 6 is of the same construction as that shown in FIGS. 1 and 2, having the peripheral surface that is provided with a plurality of mold cavities 7 of any desired planar configuration, each of said mold cavities being provided with each one central suction orifice 8 at the bottom leading to the internal space of the molding cylinder, said cylinder body 6 being also provided at one end with a drive gear ring 28 adapted to be externally driven. However, in this design, because the cylinder body 6 is made as a cylindrical member completely open at both ends, for supporting it for horizontal rotation, the lower periphery of both ends of this cylinder body 6 is supported by carrying rollers 30 which are rotatably mounted on respective supporting shafts 29 spacedly located on the machine frame members at both sides, said carrying rollers 30 being provided with an end flange for slidingly engage with the end faces of said cylinder body 6 for inhibiting an axial displacement thereof. A suction case 14, suction pipe 15, hollow shaft 10, compression coil spring 16 for forcing the opening edge of the suction case 14 against the internal surface of the cylinder body 6, a seat 17, adjusting members 18, threaded rod 19 and handwheels 20, all disposed in or near the cylinder body 6 for vacuum operation, are of the same constructions as those of their counterparts shown in FIGS. 1 and 2, but both ends of the hollow shaft 10 and those of the threaded rod 19 are extended through and supported by the bearing portions 12 which are rotatably mounted in the machine frame members 11 at both sides of the apparatus. Inside the cylinder body 6 in the lower part thereof, there is disposed a cooling case 32 with its both ends projecting beyond the cylinder body 6 and secured on the bearing portions 12 of the machine frame members 11 at both sides of the apparatus and with its peripheral side opening edge equipped with a packing piece 34 that is forced onto the internal cylindrical surface of the cylinder body 6 by springs 33 so as to form an air-tight space inside said cooling case. Horizontally disposed inside the cooling case 32 are a water suction pipe 22 and a water injection pipe 25, and the water suction trough opening 23 of the water suction pipe 22 is located in a proximity of the lowermost position of the internal cylindrical surface of the cylinder body 6, while the water injection pipe 25 is located in the upper region near the engagement portion between the molding cylinder MS and the pressure roller PR.

Therefore, the molding cylinder MS having a construction shown in FIGS. 3 and 4 is capable of continuously producing cushioning laminated products precisely in the same manner and on the same operating principle as the molding cylinder illustrated in FIGS. 1 and 2. The only difference between these two cylinder constructions is that while in the design shown in FIGS. 3 and 4, it is not the whole internal space of the molding cylinder body 6 but only the interior of the cooling case 32 in which cooling water is delivered out of the water feed pipe 27 and sucked up creating a degree of vacuum, and the operating results are identical as far as cooling is concerned in both these constructions. Since, as described above, the molding cylinder shown in FIGS. 3 and 4 is provided with a cooling case 32 in which a degree of vacuum is produced by water suction, no such provision as the shield plate 21 for blocking the suction orifices 8 is required. It should be understood that an apparatus according to the present invention is by no means limited to the particular structures illustrated in the accompanying drawings and many changes and modifications can be made within the spirit and scope of the invention.

It is apparent from the foregoing description that in the continuous fabrication of cushioning laminated products in the form of a sheet in which a plurality of independent gas-containing cells are distributed, out of thermoplastic synthetic resin material, the present invention has a number of advantageous features which include, among others:

Because the molding cylinder which plays dominant roles in this kind of embossing operation is cooled by water directly injected in its internal space, the cylinder is cooled with an extremely high efficiency, i.e., high in speed and effect of cooling, not only the embossing speed can be increased, but also the overall production efficiency can be considerably enhanced. Furthermore, since the cooling water introduced into the internal space of the molding cylinder serves to create a degree of vacuum as it is extracted out under suction, no water leaks out through the suction orifices into the mold cavities, the cylinder construction is simplified, troubles and malfunctioning are eliminated and the fabrication cost is made low. Furthermore, since the plastic film is biaxially oriented at the optimum temperature in the process of embossing by the pressure of the atmosphere under a vacuum applied to the molding cylinder, the embossed products are high in strength, and also, because the temperature of the plastic film when it is put around the molding cylinder can be adjusted at will to attain the optimum molding condition, products of excellent quality can be obtained.

I claim:

1. Apparatus for continuously fabricating a cellular laminated material from first and second plastic films comprising
   1. die members for continuously extruding said first and second films from a thermoplastic resin in a heat softened condition,
   2. a cylindrical molding means that is rotatable about a first axis,
   3. means for feeding said first film into circumferential contact with said cylindrical molding means,
   4. a plurality of mold cavities on the periphery of said cylindrical molding means, said mold cavities being shaped to impart an embossed pattern to said first film,
   5. a suction orifice in each of said mold cavities,
   6. a hollow shaft extending centrally through said cylindrical molding means for rotatably supporting said cylindrical molding means,
   7. a suction chamber and air suction means operatively associated with said hollow shaft and with the interior of said cylindrical molding means for maintaining a reduced pressure therein,
   8. means operatively connected with said hollow shaft for adjusting the size of said suction chamber,
   9. passageways extending between said hollow shaft, the suction chamber and said suction orifices whereby air suction communication is established therebetween said shaft and those mold cavities that are in alignment with said suction chamber,
   10. means located interiorly of said cylindrical molding means for charging and discharging a liquid cooling medium into cooling contact with a portion of the interior surface of said cylindrical molding means,
   11. a pressure roller means rotatable about a second axis and positioned so that its outer surface will bear against the outer surface of said cylindrical molding means at a point on said cylindrical molding means downstream from the formation of said embossed pattern,
   12. means for feeding said second film between said cylindrical molding means and said pressure roller means, and
   13. prior to the cylindrical molding means a roller for cooling said extruded, heat softened first film, a roller for heating said cooled first film, and a roller for stretching said heated first film.

2. Apparatus according to claim 1 wherein said stretching-heating roller is rotated at an accelerated peripheral speed as compared with the peripheral speed of said heating roller.

3. Apparatus according to claim 1 which includes a take-up roller having cooling means therein and mounted to cooperate with said cylindrical molding means to take up the fabricated cellular laminated material leaving said cylindrical molding means.

4. Apparatus according to claim 3 wherein said cooling roller, said heating roller, said stretching and heating roller, said pressure roller, said cylindrical molding means and said take-up roller are arranged to have their longitudinal axes parallel to each other.

5. Apparatus according to claim 1 wherein said cooling liquid charging and discharging means includes a water suction pipe having a water suction trough.

6. Apparatus according to claim 3 wherein said cooling liquid means includes a water injection pipe having injection orifices associated with said water suction pipe near the engagement portion of said cylindrical molding means and said pressure roller.

7. Apparatus according to claim 3 and includes a cooling case operatively disposed inside said cylindrical molding means and being arranged so that its opening edge facing the inner surface of said molding cylindrical means makes an air-tight contact therewith.

* * * * *